3,565,538
SAMPLING TECHNIQUE USING OPEN HOLDER
Herbert L. Kahn, Westport, and George E. Peterson, Hamden, Conn., assignors to The Perkin-Elmer Corporation, Norwalk, Conn., a corporation of New York
Filed Jan. 24, 1968, Ser. No. 700,219
Int. Cl. G01n 1/10
U.S. Cl. 356—246                                    2 Claims

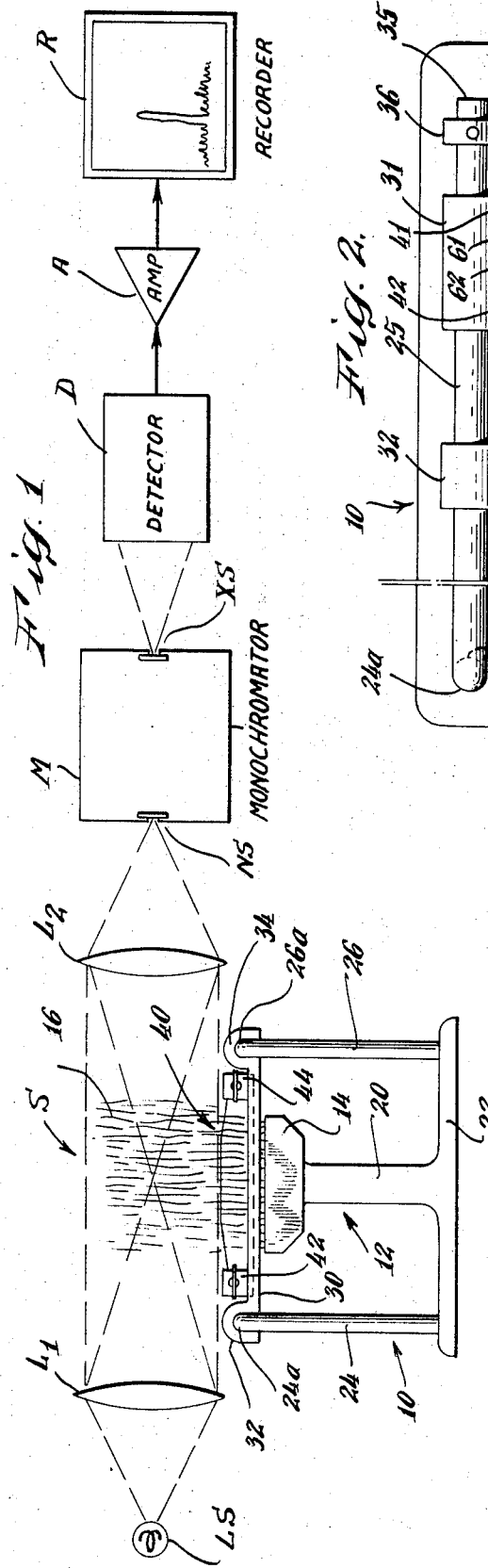

ABSTRACT OF THE DISCLOSURE

A sampling technique for atomic absorption spectroscopy utilizes a small quantity (e.g., one-half of a milliliter) of a sample solution. This sample is placed in a small boat-shaped holder, dried (e.g., by being placed near but not in the flame of the spectrometer), and then placed into a conventional flame (e.g., of air-acetylene). Improvement in detection (as compared to conventional aspiration of the liquid samples slowly into the flame) for readily atomized elements (e.g., lead, zinc, silver, mercury, selenium, arsenic, cadmium, thallium, etc.) is typically between ten and one hundred times. Extremely small sample amounts (i.e., less than 0.1 milliliter) may be analyzed with good repeatability.

---

This invention relates to an improved sampling technique and apparatus useful, for example, in atomic absorption spectroscopy. More particularly the invention concerns a technique and device for first drying a liquid sample and then placing the dried sample directly into the flame of an atomic absorption spectrometer.

As described, for example, in United States Letters Patent 2,847,899 to A. Walsh, atomic absorption spectroscopy is a technique for determining the amount and/or concentration of one or more metallic elements in a sample material by: vaporizing the sample so that the metallic elements are in their atomic state, passing through this vaporized sample a beam of radiation including at least one spectral line at which the metallic element absorbs in its atomic state, and measuring the amount of absorption occurring at that spectral interval. Presently available commercial instruments exist of the single-beam type (i.e., conforming in principle to the Walsh FIG. 1) and of the double-beam type (i.e., conforming in principle either to the optical null system of FIG. 2 of the patent or the mentioned, column 4, lines 5–7, ratio-recording type).

Regardless of their exact construction, such atomic absorption spectrophotometers typically use the same general type of sampling. Specifically, the sample, in the form of a relatively dilute solution of the sample substance containing the metallic element or elements, is sprayed or otherwise aspirated in a continual fashion into an open flame (for example, from an air-acetylene burner). The flame more or less simultaneously evaporates the solvent and converts the metallic sample element to its atomic state. The present invention involves an improved different technique (and apparatus) for introducing the sample material into the flame of an otherwise conventional atomic absorption spectrophotometer. Broadly stated the inventive technique comprises placing a small quantity of, say, liquid sample in an open (for example, boat-shaped) holder or receptacle, drying this sample material as by heat (for example, by placing the holder near but not in the flame of the spectrophotometer), and then placing the "boat" holder with the sample into the flame while the spectrophotometer is operating. This technique (as hereinafter more fully described in detail) is capable of improvement of detection limits, at least for readily atomized elements, between one and two orders of magnitude (i.e., ten to a hundred times improvement). In addition to this markedly increased sensitivity, the technique of the invention offers the following further advantages: no preparation of the sample is ordinarily necessary; the actual analysis time (i.e., sample in the flame and the spectrophotometer operating) is greatly reduced; and extremely small sample quantities may be successfully analyzed.

An object of the invention is therefore the provision of a technique and apparatus for introducing the sample material into the flame of an atomic absorption spectrophotometer, which yields substantially greater sensitivity (i.e., detection limits) than has heretofore been realizable.

Another object of the invention is the provision of an improved sampling technique and apparatus for atomic absorption spectroscopy which provides not only greater sensitivity, but also elimination or at least simplification of any sample preparation, fast analysis times, an adaption of the atomic absorption spectroscopy techniques to not only extremely low concentration elements but also extremely small total sample amounts.

Further objects, features and advantages of the invention will become obvious to one skilled in the art upon reading the following detailed description in conjunction with the accompanying drawing, in which:

FIG. 1 is a partly schematic representation of a simplified atomic absorption spectrophotometer, showing the sample technique and exemplary apparatus of the invention;

FIG. 2 is an enlarged plan view of the sampling portion of the apparatus of FIG. 1, showing more detail of the exemplary apparatus including the boat-shaped receptacle for holding the sample material; and FIG. 3 is a further enlarged horizontal cross section through the "boat," taken along the lines III—III in FIG. 2, more clearly showing the cross-sectional shape of the sample holder or receptacle.

A schematic illustration of a single-beam atomic absorption spectrophotometer is given in FIG. 1, merely for exemplary purposes, since this is the simplest type of instrument. The inventive sampling technique and apparatus may be utilized with any type of atomic absorption spectrophotometer, and in fact would preferably be used with a double-beam instrument (for example, the double-beam, ratio-recording atomic absorption spectrophotometer manufactured by The Perkin-Elmer Corporation, Norwalk, Conn., as the Model 303), for reasons inherent in such double-beam instruments and well known to those skilled in the art. The conventional, diagrammatically shown parts of the spectrophotometer have been labeled by the use of letters in FIG. 1, while the parts more directly involved in the invention are subsequently described by the use of reference numerals.

In the exemplary single-beam instruments, a light source LS emits radiation including at least one spectral line which the tested-for metallic element absorbs in its atomic state. An optical system, schematically exemplified by lenses $L_1$ and $L_2$, directs a beam of this radiation from the light source through a sample location, generally indicated at S, at which the sample material (in its atomized state) will intercept the beam. After passing through the sample location (and the second part of the optical system $L_2$) the beam will enter a monochromator M as at its entrance slit NS. The variable monochromator will be set so that only the desired narrow spectral interval intended to be measured will leave the exit slit XS. Thus only the wavelength interval of the original beam which generally corresponds to the spectral line at which the tested-for sample absorbs will reach the detector D. The electrical output of the detector will be amplified (and in general rectified) so as to provide a final electrical output which varies as (for example, is proportional to) the absorption of the sample material at the spectral line used in the analysis. This final electrical output may be fed to a meter, or as shown, to a chart-type recorder R so as to yield a permanent record of the absorption (the exemplary graph showing the amount of the beam absorbed at the tested-for spectral line before, during and after the sample was present in the beam). Since the invention itself concerns solely the manner in which the sample is caused to be introduced into the beam, and the invention may be used with any atomic absorption spectrophotometer, there appears to be no need to describe any of the details of the exemplary spectrophotometer schematically shown or to explain its well-known operation (see the above-mentioned U.S. Pat. 2,847,899, for example). Therefore, the following will, for the most part, describe in detail only the structure and operation of those parts generally shown in the sample area S in FIG. 1, and shown in more detail in FIGS. 2 and 3.

The sampling apparatus according to the invention is shown generally at 10 in FIG. 1 and includes a known type of burner 12, having a relatively long (in the horizontal direction in FIG. 1) head 14 so as to provide a flame 16 having a substantial length along the beam as indicated. The burner head 14 may have a plurality of (say, three) essentially parallel slots on its upper surface, as indicated at 18a, 18b, 18c. The burner head 14 may, for example, be like the one described in the E. A. Boling article, "A Multiple Slit Burner for Atomic Absorption Spectroscopy" in Spectrochimica Acta, vol. 22, No. 3 (1966) at pp. 425–431. For this reason the width of the flame (i.e., the dimension in the direction of the line perpendicular to the plane of the paper in FIG. 1 or the apparently vertical direction in FIG. 2) will also be relatively extensive. Thus, the flame will have a cross section as seen in the plan view of FIG. 2 of a relatively large rectangle, more or less co-extensive with the dimensions of the burner head 14 in that figure; additionally as may be seen in FIG. 1, the flame is quite tall in the vertical plane. Thus, the flame has a large cross section as "seen" by the beam in FIG. 1 (i.e., a vertical cross-sectional plane perpendicular to the paper in FIG. 1), as well as a substantial length along the beam (i.e., the horizontal direction in FIG. 1). For this reason a sample vapor cloud which is even partially co-extensive with the flame will have a substantial effect on the beam intensity at those spectral lines at which the atomized sample absorbs. The burner head 14 is supplied with a fuel and oxidant mixture (for example, acetylene and air, respectively) to its column or post 20.

The base 22 of the burner is shown as being unusually long (i.e., in the horizontal direction in FIG. 1), to illustrate an exemplary manner in which the otherwise conventional burner 12–20 may be readily adapted to the sampling technique of the invention. The especially long base 22 supports a pair of rods 24, 26 which (as may be seen from a comparison of FIGS. 1 and 2) include a right angle bend at 24a, 26a, respectively, so as to continue as substantially horizontal rod portions 25, 27 respectively. These parallel horizontal rods support a sliding carriage 30, as by passing through ears 31, 32, 33 and 34 integrally formed adjacent the corners of the carriage 30. Stop means 36, 38 may be atached near the free ends 35, 37 of horizontal rods 25, 27 so as to limit movement of the carriage 30 to a particular, repeatable position.

As may best be seen in FIG. 2, carriage 30 is generally U-shaped, so as to avoid interference with the flame when it is at its extreme position (i.e., engaging stops 36 and 38, as in FIG. 2). Near ears 31 and 33, the carriage 30 supports a pair of releasable holding means for the sample holder, for example, "boat" 40 (hereinafter more fully described). In the exemplary embodiment shown, each of these releasable holding means comprises a pair of posts or lugs 41, 42 and 43, 44 rigidly attached to the carriage 30. Each of the lugs 41–44 has threaded apertures, engaged by a clamping screw 45, 46, 47 and 48, respectively. Each of these clamping screw assemblies (45–48) comprises a screw portion 51–54, respectively, engaging the corresponding threaded hole in the various posts or lugs 41–44, respectively. Each screw portion 51–54 has at its remote end an integrally formed handle portion 55–58, respectively; and at the confronting ends of the screw portion 51–54 is carried a clamping pad 61–64, respectively. Thus, the construction of the clamping screw assemblies 45–48 (i.e., elements 51–64) is such that opposing pairs (i.e., assemblies 45 and 46, and assemblies 47 and 48) act as releasable clamps to hold anything present between their respectively clamping pads (61, 62 and 63, 64).

The sample holder or receptacle 40 itself may be simply made by folding to substantially a right angle (see FIG. 3) a thin flat sheet 70 of a suitable material (for example, a heat resistant metal), and then crimping the ends of the folded sheet as indicated at 71 and 72 in FIG. 2. The resulting shape of the exemplary sample holder 40 thus resembles a boat (in particular, one having both ends pointed, as a conventional lifeboat). The exact shape of the sample holder receptacle 40 is not critical, although it should have the structural characteristics hereinafter more specifically pointed out as being necessary for its successful operation. A substantially dry sample covering, the lower part of the interior surface of the "boat" receptacle 40, is shown at 80; the reason that the sample tends to form such a coating will become apparent from the description of the operation and examples immediately following hereinafter.

OPERATION

A small measured quantity of sample solution (for example, one-half milliliter) is preferably used for a boat about four inches long and having its sides 74, 76 in FIG. 3 about 3/16 of an inch wide as measured from their joining point or fold, which may be about a 90° angle. After the sample solution is placed in the boat 40, the liquid in the sample is dried, for example, by bringing the boat close to but not into the flame, by sliding carriage 30 into a position moderately close to but substantially removed from the stops 36, 38 (see FIG. 2). This pre-drying avoids splattering of the liquid sample material during analysis, which splattering substantially interferes with the obtaining of a useful signal from the spectrophotometer. Obivously, the sample-containing "boat" 40 may be dried by other means (for example, by placing it on a hot plate or the like). After the liquid in the sample has substantially evaporated so as to leave a solid residue as shown at 80 in FIGS. 2 and 3, the carriage is slid into the position shown most clearly in FIG. 2. Because the sample atomizing and the ensuing atomic absorption occurs very quickly, the various parameters of the spectrophotometer and its recording means are set for rapid response. It has also been found important, in fact crucial, that the shape and width of the "boat" relative to the burner head 14 be such as to allow the flame to curl about the sides (74, 76) and carry the sample vapor into the optical beam. Unless the solid sample material is so exposed, substantially no absorption signal will be obtained. A burner having a wide and preferably multi-slotted head (for example, of the type described in the aforementioned Boling article) should be used.

EXEMPLARY RESULTS

Example I(a)

Test samples of lead were made up in concentrations of one part per million (p.p.m.), 0.2 p.p.m., 0.1 p.p.m., 0.05 p.p.m., and 0.01 p.p.m. One-half of a milliliter of each of these samples was in turn introduced into a different "boat" holder 40, and analyzed using a Perkin-Elmer Model 303 Atomic Absorption Spectrophotometer (commercially available from The Perkin-Elmer Corporation, Main Ave., Norwalk, Conn.; this instrument is described, for example, in an article by Herbert L. Kahn and Walter Slavin entitled "An Atomic Absorption Spectrophotometer" in Applied Optics, vol. II, No. 9 (September 1963) at pp. 931–936); the Automatic Null Recorder Readout, commercially available as an accessory for this instrument (Perkin-Elmer part No. 303–0103); and a fast response, 0–10 millivolt full-scale deflection chart recorder, namely, the Servo/Riter II recorder (manufactured by the Texas Instruments Company, Inc., 3609 Bufflalo Speedway, Houston, Tex.). All tests were run at high chart recorder speed (twelve inches per minute), with the noise suppression setting of the Recorder Readout set at 2 (a relatively low time constant, suitable for sampling times of approximately five seconds or less). A three-slot Boling Burner head (commercially available as Perkin-Elmer part No. 303–0202), and of the type described in the article by E. A. Boling (previously noted), was used with a mixture of acetylene and air. One-half milliliter of each of the test samples was introduced into a "boat" (40) made from a 0.01 inch thick sheet of tantalum of the dimensions previously mentioned; the sample and "boat" were then put in a fixture, conforming in principle if not in detail to the carriage shown (at 30) and moved close to but not in the flame until the sample dried. After substantially complete evaporation of the diluent (in this case water) the dried lead salt (which in this case was lead nitrate) was introduced into the flame by sliding the fixture or carriage to its stopped position, so as to position the boat as shown in FIGS. 1 and 2. As previously mentioned, the flame curls over the sides (74, 76 in FIG. 3) of the "boat" 40, so that the sample material is drawn up into the optical beam at a relatively rapid rate. Typically, the absorption starts substantially immediately upon introduction of the "boat" into the flame (there is approximately a one-second delay) and continues for about three seconds.

The 0.2 p.p.m. test sample gave an absorption reading of approximately 17%, which is an improvement in sensitivity over conventional techniques (in which the sample solution is aspirated into the flame) of approximately forty times. The 0.1 p.p.m. and 0.05 p.p.m. test samples yielded proportional absorption signals (i.e., over 8% and just over 4%, respectively). By setting the scale expansion of the automatic null recorder readout to 10 (i.e., providing an amplifier gain of 10 in the signal supply to chart recorder and therefore increasing the sensitivity of the chart recorder by a factor of 10), proportional readings of 30 units for the 0.05 p.p.m. and 6 units for the 0.01 p.p.m. samples are obtained. Since the integrated noise level was on the order of one unit at the chart recorder, the estimated detection limit was about 0.002 p.p.m. of lead for such a one-half milliliter sample. Since the rate at which the dry sample is vaporized into the flame is dependent, not on the original amount of liquid sample, but essentially on the amount of solids remaining in the sample after the preliminary drying process, it is the total amount of solids in the sample (and in particular the total amount of the tested-for metallic element) which determines the ultimate detection limit. Thus, for the above test series, one can say that the detection limit for lead is one nanogram (i.e., a billionth of a gram). It is experimentally verifiable that it makes little difference whether one uses, for example, one-half milliliter of an 0.02 p.p.m. lead sample solution or one milliliter of an 0.01 p.p.m. similar sample solution; the results will be essentially the same.

Example I(b)

Following the above test or calibration results, a "real" sample was prepared by adding 0.04 p.p.m. lead to normal urine. Because of the presence of organic substances in the original sample solution, it is necessary that the drying step not only evaporate the liquids but char the remaining (organic) solids; otherwise when the "boat" is placed into the flame, the smoke from the carbon causes an extremely large (false) absorption signal. To minimize the charring time, only a sample of 0.15 milliliter was used in each case. To eliminate any "background" absorption, a calibration run was first made by setting the monochromator to a non-absorbing spectral interval (namely, 280 millimicrons). For this particular sample of urine, such background absorption read 6.5 divisions, which represents the general (i.e., non-spectral, non-atomic) absorption of the various other solids in the sample. Similar 0.15 milliliter samples of the same urine with and without the addition of 0.04 p.p.m. additional lead were analyzed at an atomic absorption spectral line (namely 283 millimicrons). For the original natural urine sample a gross reading of 14 divisions (i.e., a net reading of 7.5 divisions after the 6.5 background absorption is subtracted) was obtained; for the same sample with 0.04 p.p.m. lead added, the gross reading was 23 divisions, for a net reading of 16.5 units. Thus, the addition of 0.04 p.p.m. lead to the sample made a difference of approximately 9 divisions. A water "standard" (i.e., made up test sample) of 0.05 p.p.m. lead gave a reading of 10 divisions, or eight divisions per 0.04 p.p.m. Thus, the analysis of the urine with and without the added 0.04 p.p.m. lead gave a difference of signal representing 110% of the actual added lead. The 7.5 division reading for the natural urine sample (without added lead) would indicate that there was approximately 0.035 p.p.m. lead in it, a figure that correlates well with existing knowledge.

Example II

Mercury test samples were run in a manner analogous to Example I(a), above. Since mercury is highly volatile, it is important that the solution is not boiled while being dried, and that the "boat" is moved into the flame soon after the solution has been dried (to avoid gradual loss of the mercury). Since mercuric nitrate, which was used to make the test samples, "falls out" of solution at very low levels of concentration (for example, almost immediately at 0.2 p.p.m. mercury, and overnight for 0.5 p.p.m.), it was expedient to use a somewhat more concentrated solution and decrease the amount of sample solution used to determine detection limits. This can be done since the total amount of sample and the concentration thereof "commutes" as far as the technique of the invention is concerned. Thus, the absorption obtained with one milliliter of a 1 p.p.m. solution is the same as that obtained with one-half milliliter of a two p.p.m. solution. Taking smaller and smaller quantities of a 1 p.p.m. solution, it was determined that the detection limit is about 0.02 microgram of mercury, from 0.02 milliliter of a 1 p.p.m. solution, and corresponding to only 0.04 p.p.m. for a full 0.5 ml. sample.

Example III

Extremely dilute aqueous solutions of silver salts were run at concentrations as low as 0.0005 p.p.m. silver, using a scale expansion of ten times (10×) with a noise suppression of 2. Since even at this extreme dilution the augmented recorder signal was about 7 divisions compared to background and flame noise of only about plus or minus 2 divisions, the detection limit was deduced to be 0.0002 p.p.m. or better. This 0.2 part per billion corresponds to only one-tenth of a nanogram (billionth of a gram) total silver present.

Example IV

For zinc test samples the detection limit is so low, that the most sensitive tests were made by utilizing smaller quantities of an 0.0025 p.p.m. zinc salt solution. Tests with this concentration sample solution, utilizing 0.5 ml., 0.1 ml., and 0.05 ml. (the last therefore corresponding to the one-half ml. quantity of only 0.00025 p.p.m. zinc) were successfully made. Since the smallest quantity-concentration test sample was still easily detectable, the detection limit for zinc appears to be about 0.00005 p.p.m. or 0.05 part per billion (i.e., one-twentieth of a nanogram zinc per ml., or only one-fortieth of a nanogram zinc in one-half ml.).

ALTERNATIVES AND CONCLUSIONS

All of the holders utilized in the specific examples were "boats" of a tantalum 0.01 inch thick sheet, in which a 3/8 inch wide strip was folded lengthwise to about 90° (so that the sides 74, 76 were about 3/16 of an inch in extent), and then crimped near the ends at a four-inch spacing (i.e., so that the resulting "boat" was four inches in length) leaving "boat" tails that were somewhat longer proportionally than those shown at 71, 72 in FIG. 2. As previously noted, such a boat has a maximum capacity of approximately 1 ml. of sample solution. The material (i.e., tantalum) was chosen merely because of its availability at the site of the tests and because of its reasonable resistance to the flame temperatures. Obviously, any heat resistant metal may be used, even the readily available and inexpensive tin-plated iron used in "tin cans." Preferably the holder should be made of a material that has very good heat conductivity (i.e., almost any metal, as well as other materials such as pyrolithic graphite), reasonable resistance to heat, lack of interfering spectroscopic lines, and relatively low chemical reactivity with the particular samples placed therein. Although the exact dimensions and configuration of the "boat" is not critical, it should have a relatively low total heat capacity so as to insure that the sample is rapidly vaporized in the final analysis step. Although designing a "boat," or adding attachments thereto, in such a way as to keep the flame out of the beam of the instrument initially appeared to be a worthwhile improvement (so as to reduce the flame noise "seen" by the instrument), it was found that so precluding the flame from the sampling area reduced the absorption by extremely large factors (substantially to 0). Thus, it appears absolutely necessary that the flame be able to curve around the solid-bottomed "boat" and directly impinge at least the area just above the dried sample (80), so as to carry its vapor directly into the beam.

Not only may the size and configuration of the sample holder be varied, but entirely different types of sample receptacles may be used. Thus, the sample holder may have a round bottom (as seen in the cross-sectional view of FIG. 3) rather than the V-shape of the exemplary holder 40. Similarly the configuration of the sample holder in plan (i.e., as seen in FIG. 2) may be generally rectangular or elliptical, for example, rather than the generally double-ended "lifeboat" shape of the illustrated example. The sample holder may be made from a wide variety of materials besides sheet metal. Thus, the entire sample holder may be made of a relatively fine wire mesh or metal gauze (having sufficiently small openings to preclude dripping of the original liquid sample). In fact, since such an open structure substantially eliminates the requirement that the holder have good thermal conductivity, various fire-resistant fabrics (e.g., fiber glass, asbestos or the like) can also be used. Obviously, other materials, configurations, and combinations of the various alternatives mentioned may also be utilized.

Although the specific examples given utilize originally liquid samples, and therefore involve a drying step prior to actual analysis, originally solid samples may be even more simply analyzed by placing them directly into the sample holder. As noted earlier, liquid samples are preferably dried within the "boat" 40 or other type of sample holder being used, either by placing the sample holder near but not in the flame, or by predrying by any conventional means (e.g., a hot plate).

As pointed out immediately above, neither the particular material, size, nor configuration of the sample holder is critical. The characteristic feature of the present invention is its ability to obtain useful absorption signals from small (i.e., fractions of a milliliter) sample solutions (or extremely small quantities of solid samples) at relatively low concentration of the tested-for metallic elements. As noted in the specific examples, an improvement in sensitivity (as measured by the detection limit) of approximately at least 10 and as much as 100 times improvement has been obtained, with reasonably readily vaporized metallic elements. For example, such additional metals as cadmium, selenium, and thallium have been successfully determined in "boats" corresponding to the type and using the general technique explained above.

For these reasons, the invention is not limited to any of the specific structural details nor exact steps of the single illustrated exemplary apparatus and various operating examples given; rather the invention is defined solely by the scope of the appended claims.

We claim:

1. In an atomic absorption spectrometer for determining the quantity of a tested-for metallic element in a sample material of the type having: a source of radiant energy including at least one spectral line corresponding to an absorption line of a tested-for element in its atomic state contained in said sample material; means for directing a beam of said radiant energy through a flame at a sample location to a spectrometric system, said system including a detector for measuring the amount of absorption occurring at said atomic spectral line so as to yield an indication of the quantity of said tested-for element contained in a sample material, the improvement comprising:

an open receptacle means for containing a small quantity of said sample material;

and movable mounting means for movably supporting said open receptacle such that said receptacle may be moved from an initial position completely outside of said flame to a final analysis position inside said flame;

said open receptacle comprising a substantially solid bottom portion and relatively shallow sides, so as to be of such construction that said flame reaches at least the area immediately above the sample material in said receptacle when said receptacle is in said final analysis position.

2. In an atomic absorption spectrometer for determining the quantity of a tested-for metallic element in a sample material of the type having: a source of radiant energy including at least one spectral line corresponding to an absorption line of a tested-for element in its atomic state contained in said sample material; means for directing a beam of said radiant energy through a flame at a sample location to a spectrometric system, said system including a detector for measuring the amount of absorption occurring at said atomic spectral line so as to yield an indication of the quantity of said tested-for element contained in a sample material, the improvement comprising:

an open receptacle means for containing a small quantity of said sample material;

and movable mounting means for movably supporting said open receptacle such that said receptacle may be moved from an initial position completely outside of said flame to a final analysis position inside said flame;

said open receptacle comprising sheet metal formed into a container having both a bottom portion and sides;

said container being substantially narrower than the flame into which it is to be introduced, whereby said flame may curl about the sides of said container and substantially reach said dry sample material.

References Cited

UNITED STATES PATENTS

| | | | |
|---|---|---|---|
| 3,128,619 | 4/1964 | Lieberman | 23—255 |
| 1,829,001 | 10/1931 | Germanos | 356—87 |
| 2,593,015 | 4/1952 | Dreher | 23—253X |
| 2,753,753 | 7/1956 | Gardner | 23—253X |
| 3,260,413 | 7/1966 | Natelson | 23—253X |
| 3,419,359 | 12/1968 | Anderson et al. | 23—253 |

ARCHIE R. BORCHELT, Primary Examiner

C. M. LEEDOM, Assistant Examiner

U.S. Cl. X.R.

23—253; 250—218; 356—87